US007002076B2

(12) United States Patent  
Ungerman et al.

(10) Patent No.: US 7,002,076 B2
(45) Date of Patent: Feb. 21, 2006

(54) ELECTRIC BOX EXTENDER

(75) Inventors: Mark E. Ungerman, Potomac, MD (US); Kenneth M. Kiely, Milford, CT (US)

(73) Assignee: Bridgeport Fittings, Inc., Stratford, CT (US)

( * ) Notice: Subject to any disclaimer, the term of this patent is extended or adjusted under 35 U.S.C. 154(b) by 0 days.

(21) Appl. No.: 11/154,410

(22) Filed: Jun. 16, 2005

(65) Prior Publication Data

US 2005/0230139 A1 Oct. 20, 2005

Related U.S. Application Data

(63) Continuation of application No. 10/794,746, filed on Mar. 5, 2004.

(51) Int. Cl.
*H01H 9/02* (2006.01)

(52) U.S. Cl. .............................. 174/58; 174/53; 174/57; 174/48; 220/3.2; 220/3.3; 248/906

(58) Field of Classification Search ................. 174/50, 174/58, 48, 17 R, 57, 53, 61, 62; 220/3.2, 220/3.3, 3.4, 3.6, 3.7, 3.8, 3.9, 4.02; 248/906, 248/343, 909; 439/535, 536, 537; D13/152
See application file for complete search history.

(56) References Cited

U.S. PATENT DOCUMENTS

| 3,115,265 | A | 12/1963 | Mulkey |
| 4,134,636 | A | 1/1979 | Kleinatland et al. |
| 4,634,015 | A | 1/1987 | Taylor |
| 5,042,673 | A | 8/1991 | McShane |
| 5,117,996 | A | 6/1992 | McShane |
| 5,402,902 | A | 4/1995 | Bouley |
| 5,736,674 | A | 4/1998 | Gretz |
| 5,959,246 | A | 9/1999 | Gretz |
| 5,975,323 | A | 11/1999 | Turan |
| 6,180,879 | B1 | 1/2001 | Gretz |
| 6,204,447 | B1 | 3/2001 | Gretz |
| 6,307,154 | B1 | 10/2001 | Gretz |
| 6,369,322 | B1 | 4/2002 | Gretz |

*Primary Examiner*—Angel R. Estrada
(74) *Attorney, Agent, or Firm*—Fattibene & Fattibene; Arthur T. Fattibene; Paul A. Fattibene

(57) ABSTRACT

An electric box assembly that includes a box extender having a tubular body with opposed sides arranged to be received within an electric box, and which box extender is formed with a pair of laterally outwardly extending face flanges arranged to be flush mounted against a wall surface in the assembled position. The box extender is devoid of any top or bottom flanges and is adapted to be secured in place within an electric box by the electric device, outlet receptacle, switch or the like. In an embodiment of the invention, the sides of the tubular body are tapered inwardly toward the central axis of the tubular body so as to permit the box extender to be nested one within the other to facilitate shipping and handling. In another form of the invention, the inner end of the box extender is provided with an inwardly turned circumscribing rear flange to define the inner opening of the box extender and which rear flange is provided with opposed clearance notches to facilitate the attachment of the wire conductors to the push-in captive lugs on the back side of an electrical device.

3 Claims, 4 Drawing Sheets

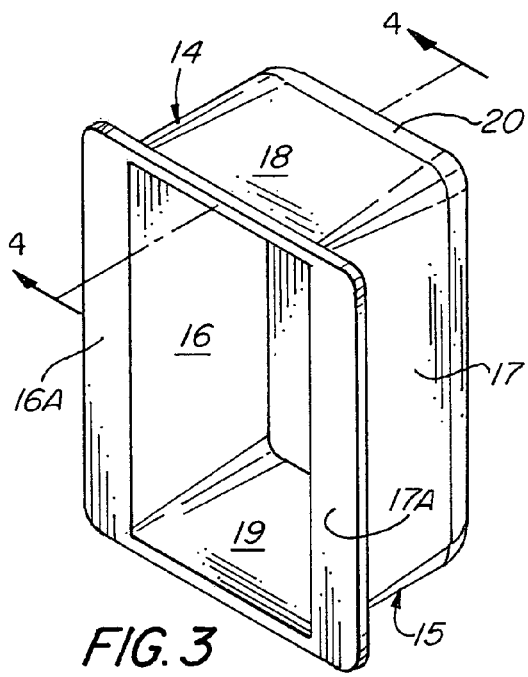
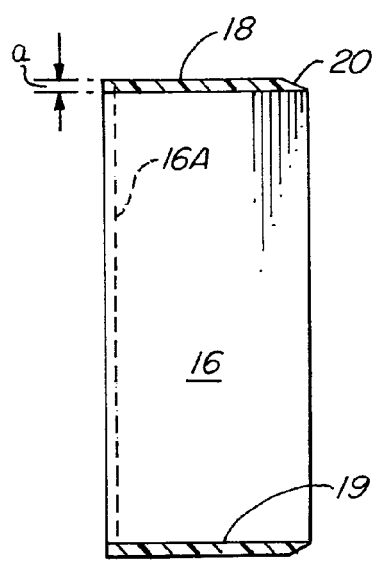
FIG. 3
FIG. 4
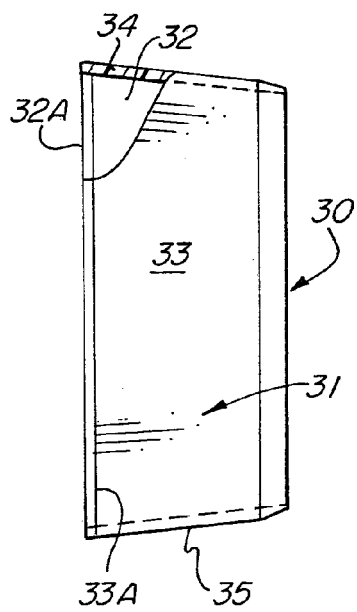
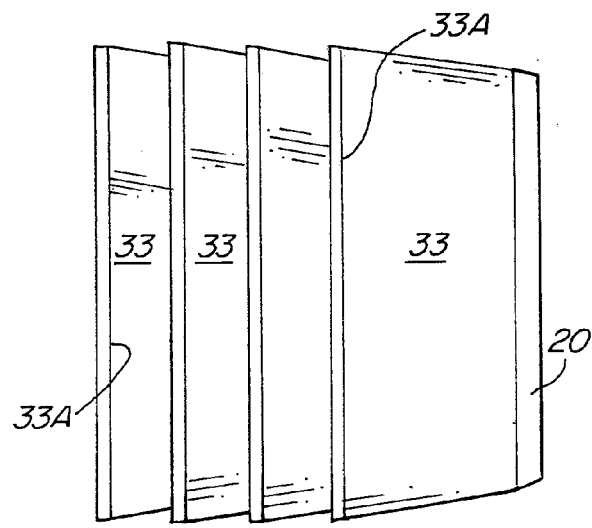
FIG. 7
FIG. 8

ELECTRIC BOX EXTENDER

RELATED APPLICATION

This application is a continuation of the co-pending patent application Ser. No. 10/794,746 filed Mar. 5, 2004, entitled Electric Box Extender.

FIELD OF THE INVENTION

This invention relates generally to electric boxes and more specifically to electric box extenders or an insulating barrier for use with and/or in combination with electric boxes which are mounted in a fashion where the electric box is recessed in a wall surface.

BACKGROUND OF THE INVENTION

Heretofore, a number of electric box extenders have been marketed by various competing manufacturers such as Bridgeport Fittings, Inc., Arlington Industries, Carlon, Inc. and perhaps others. All of the known or available box extenders are generally similar in construction in that the known box extenders include a circumscribing face plate having rearwardly connected extending sides or wings defining a body portion arranged to be received into an existing installed electric box to form an extension thereof, and whereby the face flange of the box extender is provided with one or more screw openings that are required to be in alignment with the screw opening of the flange or mount of the installed electric box. The prior known electric box extenders are secured to the installed and recessed electrical box by the screws or fasteners that secure the electrical receptacle, e.g. a switch or outlet, to the electric box. Such known extenders are disclosed in U.S. Pat. Nos. 4,134,636; 5,042,673; 5,736,674; 5,117,996; 5,959,246; 6,180,879; 6,204,447; 6,307,154 and 6,369,322.

The prior known electric box extenders are relatively complex in structure, some being formed of several components, e.g. as disclosed in U.S. Pat. Nos. 3,115,265 and 5,042,673. It has also been noted that, frequently, difficulty has been encountered in the installation of the known box extenders due to the requirement of the need to align the various screw openings of the assembled parts for securing the electric box extender to the installed electric box. As a result, the installation of such extenders is tedious and time consuming.

Because of the construction of such prior known electric box extenders, the shipping of such box extenders is cumbersome in that such box extenders, having integrally formed tubular walls, are generally loosely shipped in large cartons or had to be individually packaged in a box to prevent damage in shipment. Such packaging only served to increase the cost of those box extenders having relatively rigid integrally formed walls to the ultimate consumers.

SUMMARY OF THE INVENTION

An object of this invention is to provide an electric box extender that is relatively simple in structure and positive in operation.

Another object is to provide an electric box extender that can be readily installed in a relatively simple manner and with a minimum of effort.

Another object is to provide an electric box extender capable of being utilized with an existing installed electric box whereby the box extender is simply positioned between an electric box and the electrical device connected to the electric box without the need of aligning the screw holes on the electric box with any complementary screw holes on the box extender.

Another object is to provide an electric box extender free of any aperture or openings that are required to be aligned with the mounting screw holes of an electric box.

Another object of this invention is to provide a modified electric box extender particularly adapted to house an electrical receptacle or device such as GFCI's that have two wire termination methods that include (a) push-in captive lugs on the back side of the electrical receptacle or device for receiving bare wires and (b) side mounted screws that are tightened onto the bare wire conductors.

Another feature of this invention is to provide a box extender having an inwardly extending flange circumscribing the inner opening of the box extender to contain any arcing that may occur as a result of an improperly assembled wire/screw connection between an electrical device housed within the box extender and the conductor wires connected thereto.

The foregoing objects and other features and advantages may be attained by an electric box extender that includes a tubular body having opposed sides and interconnected top and bottom sides which are adapted to be telescopically received within an installed electric box. The box extender includes laterally and outwardly extending face flanges connected to each of the opposed sides of the tubular body. In accordance with this invention, the top side and bottom side of the tubular body are devoid of any flange and screw holes or apertures for receiving a fastening screw.

In a modified form of the invention, the respective opposed sides and connected top side and bottom side may be inwardly tapered or sloped to permit the electric box extenders to be nested or stacked one within the other so as to facilitate shipping and handling.

In another modified embodiment of the invention, the electric box extender at the inner end thereof is provided with a laterally inwardly extending circumscribing rear flange defining a rear opening and against which an electric device, e.g. a GFCI device, abuts. The rear flange is also provided with opposed notches for accommodating the ends of the wire conductors which are retained by the push-in captive lugs in the back side of the GFCI electric device. If desired, this modified embodiment may be further modified by having the opposed sides of the body portion tapered inwardly whereby like box extenders may be nested or stacked one within the other to facilitate shipping, handling, and/or the storage thereof.

The design and construction of the electric box extender, in accordance with this invention, permits one to extend an installed electric box simply by inserting the tubular body of the extender into the existing electric box until the opposed side flanges are brought flush to the outermost wall surface without requiring the alignment of any screw holes. The arrangement is such that the electric box extender is secured in place by the fasteners or screws securing the electric device, e.g. the outlet or switch component, to the screw mount or tapped hole on the installed electric box.

An advantageous feature of the box extender is that it may be used with an electric box that is flush mounted to a wall surface to insulate at least a portion of an electric box from the wires and connected electric device mounted in the electric box. Such use is dependent upon the relative dimensions of the electric box and the extender, which operates as a barrier or insulator rather than an extender.

IN THE DRAWINGS

FIG. 3 is a detail perspective view of an embodiment of the box extender according to the invention.

FIG. 4 is a vertical sectional view of the box extender taken along line 4—4 on FIG. 3.

FIG. 7 is a side view of a modified embodiment of the electric box extender in which the opposed sides of the tubular body are inwardly sloped to permit the nesting of one extender within another extender.

FIG. 8 is a side view of the modified embodiment of FIG. 7 shown in the nesting position.

DETAILED DESCRIPTION OF THE PREFERRED EMBODIMENTS

Figure 1:
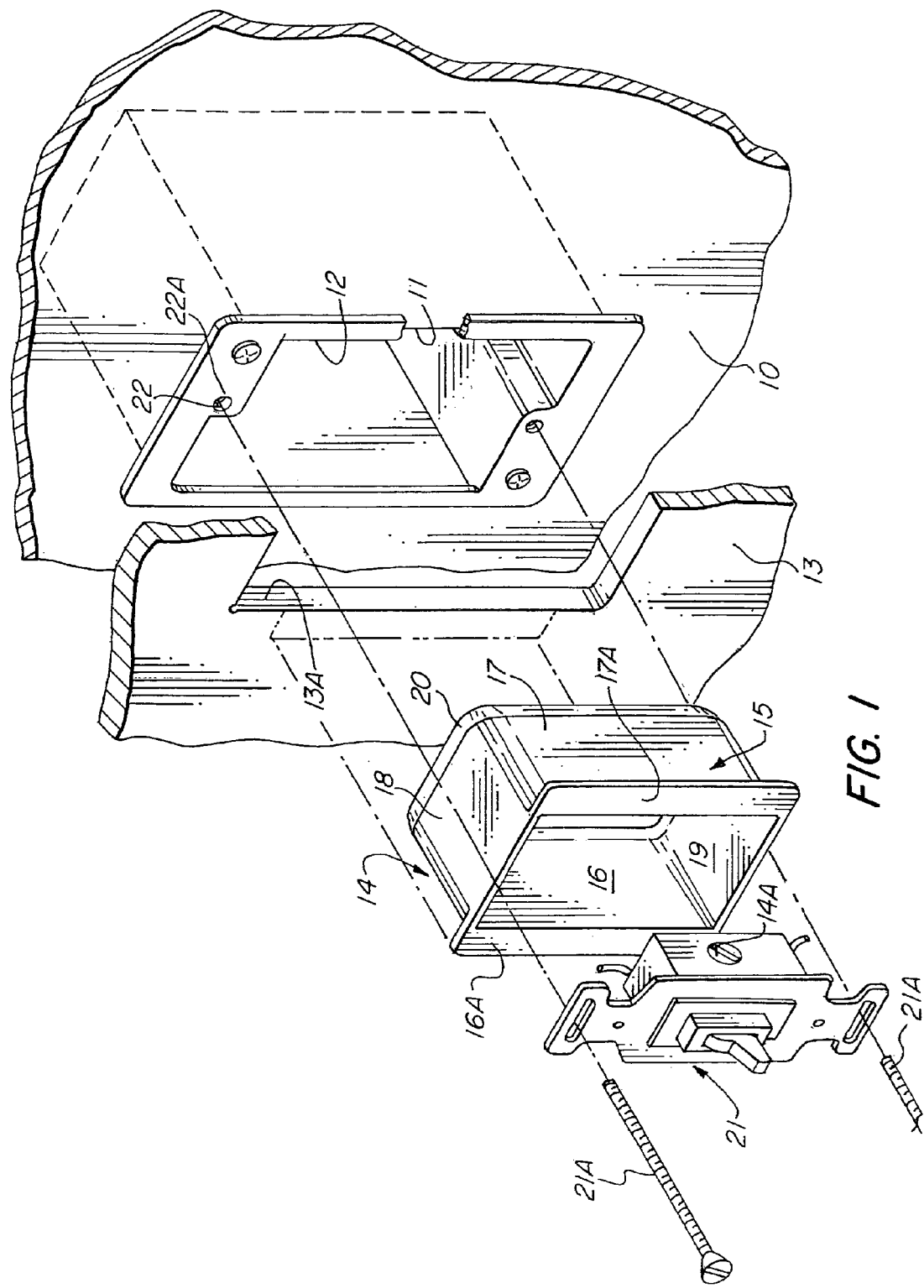
FIG. 1 is a perspective exploded view illustrating how an embodiment of the electric box extender is utilized in combination with an installed electric box and the electrical device to be secured to the electric box.
Figure 5:
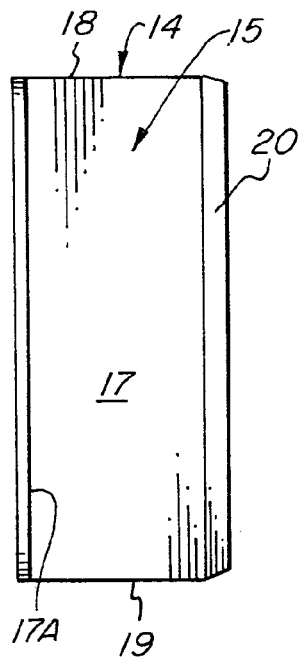
FIG. 5 is a side view of FIG. 3.

Referring to the drawings, there is shown in FIG. 1 a wall 10 having a wall opening 11 and a typical electric box 12 mounted in alignment with the wall opening 11 and secured by suitable fasteners. While one type of electric box is shown in the drawings, the specific type of electric box is not critical. In the event the wall 10 is resurfaced with a new or covering wall surface 13, code and safety requirements mandate that the electric box, e.g. box 12, be located flush with the new wall. Because it is difficult, if not impossible, to relocate the electric box 12 secured with respect to the old wall, this invention provides for a box extender 14 which is adapted to be received within the electric box 12 and which, together with the electric box 12, effectively functions as an electric box which is rendered flush with the new wall 13 to satisfy any code requirements.

As shown in FIG. 1, the new wall 13 is provided with an opening 13A which is in alignment with the opening 11 in the old wall 10. The box extender 14, in accordance with this invention, includes a tubular body 15 having opposed side walls 16, 17, a top wall 18 and a bottom wall 19 which are integrally connected to and between the side walls 16 and 17. Preferably, the wall thickness of the tubular body may range between 0.045 to 0.062 inches.

Connected to the front end of each of the side walls 16 and 17 of the tubular body 15 is a laterally outward face flange 16A and 17A respectively. The box extender 14 thus described is devoid of any flanges that connected to the top wall 18 and bottom wall 19, and is devoid of any screw holes. The arrangement is such that the tubular body 15 is inserted into opening 13A so that the innermost end is received within the front opening of the electric box 12, with the face flanges 16A and 17A disposed flush with the surface of the new wall 13.

Figure 2:
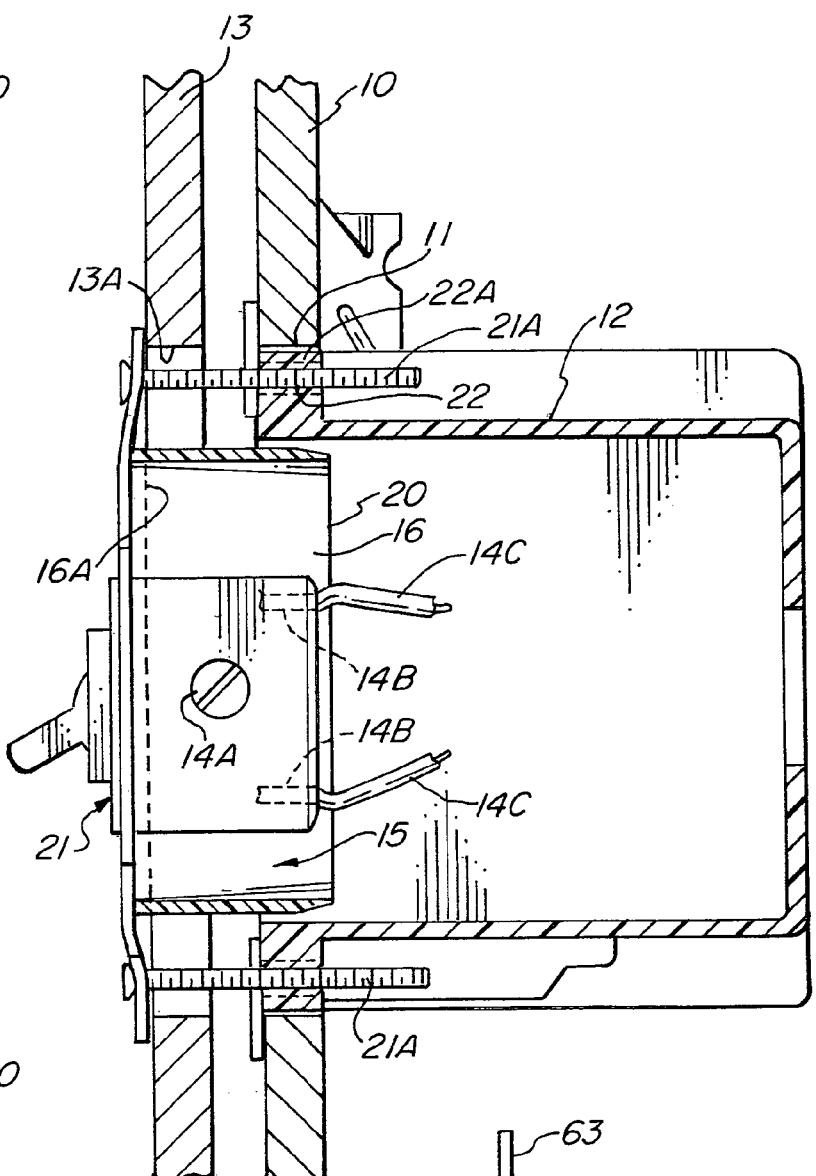
FIG. 2 is a sectional side view illustrating an embodiment of the box extender in an operative assembly.

As best shown in FIG. 2, the innermost end of the tubular body 15 may be provided with an inwardly tapered edge 20 which circumscribes the entire periphery of the innermost end of the tubular body 15. The taper or slope of the edge 20 may be approximately 15° plus or minus a few degrees relative to the adjacent or corresponding inner surface of the respective sides. The tapered edge 20 functions to facilitate the insertion of the box extender 14 into the recessed electric box 12.

With the box extender 14 inserted through opening 13A and with the inner end 20 positioned within the electric box and the face flanges 16 and 17 flush with the outer surface of the new wall 13, the box extender 14 is secured in place by the electric device 21, e.g. a plug outlet, or a wall switch and the like, simply by threading the fastening screws 21A of the electrical device 21 to the mounting holes 22 located in a screw mount or boss 22A on the electric box 12. By installing the electrical device 21 to the electric box 12 in the customary manner, the box extender 14 is made secured between the electric device 21 and the electric box 12, as seen in FIG. 2. As the box extender 14 is devoid of top and bottom flanges, that heretofore required screw openings for alignment with the mounting screw holes 22 in the electric box 12, the instant invention obviates the need of aligning any screw openings on the box extender 14 with the screw holes 22 of the electric box 12. Thus, the installation of the instant box extender 14 is greatly simplified.

Preferably, the box extender 14 described can be readily molded of a suitable plastic, e.g. nylon, polyvinylchloride (PVC), or other suitable fire resistant material, as a unitary member. The electric box 12 may be formed of metal or plastic.

It will be understood that the electric device 21 may be of a type having any wire termination means, including without limitation, one and/or two wiring termination methods. The electric device 21 may be provided with opposed side mounted screws 14A and/or push-in captive lug opening 14B for receiving the bare ends of the conducting wires, e.g. conductors 14C, 14C. When using screws 14A for effecting the electrical connection, the stripped bare end of the conductor wire 14C is hooked about the shank of screw 14A, which is then tightened onto the bare end of the conductor. Using the alternate connection method, the bared end of the electrical conductor 14C is merely inserted into the push-in captive lug opening 14B. The device wire termination means is not critical to the invention. For example, the device may have pre-connected wire leads intended to be connected to the house wiring.

Figure 6:
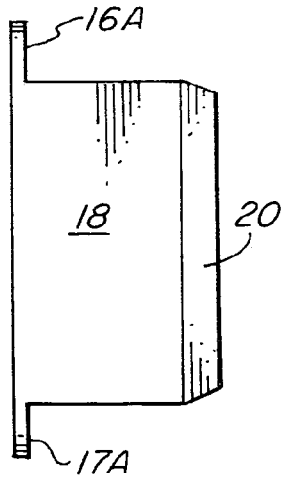
FIG. 6 is a top view of FIG. 3.
Figure 6A:
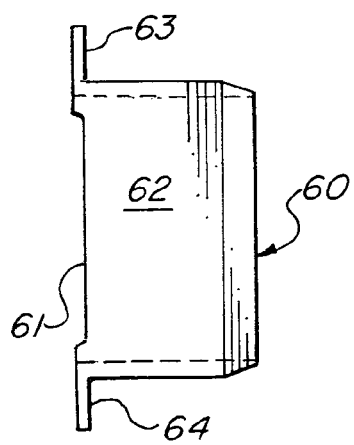
FIG. 6A is a top view of an alternative embodiment.

FIG. 6A shows an alternative configuration of the extender 60 with a recessed central portion 61 of the front surface of the top wall 62. The front surface of the bottom wall may also be configured with a similar recess 61. Of course, the extender 60 may be oriented in any manner and the use of the terms top, bottom, left and right is only for ease of describing the figures. In use, the extender 60 will be oriented in alignment with the electric box. The recesses 61 may be provided so that the device 21 installed in the box 12 is flush mounted with respect to the surface of the wall 13 and to eliminate or reduce any deformation of the device 21 mounted in the electrical box.

Figure 11:
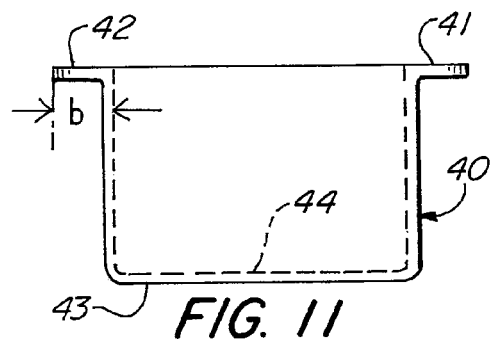
FIG. 11 is a top view of an embodiment according to FIG. 9.

The thickness of the front edge of the extender along the top and bottom walls is shown as dimension a, FIG. 4. The width of the front flange of the extender along the side walls is shown at dimension b, FIG. 11.

FIGS. 7 and 8 illustrate a further embodiment of the invention. In this form of the invention, the box extender 30 includes a tubular body 31 defined by opposed sides 32 and 33 interconnected by a top side 34 and bottom side 35 that taper inwardly toward the central axis of the tubular body 31, as shown. Preferably, the respective sides 32, 33, 34 and 35 are sloped or tapered at approximately 15 to 20 degrees. In all other respects, the construction of the modified embodiment of FIGS. 7 and 8 is the same as hereinbefore described. The tubular body 31 is also provided with lateral face flanges 32A, 33A connected to the opposed sides 32 and 33.

The sloping of the respective sides 32–35 of the tubular body 31, as seen in FIGS. 7 and 8, provide for at least two important advantages. The tapering or sloping of the respective sides 32–35 of the tubular body 31 will enable the box extender 30 to be utilized with those electrical boxes which may be provided with inwardly projecting obstruction as the tapered embodiment may be more readily received within the electrical box. Another important feature of the tapered embodiment of FIGS. 7 and 8 is that the box extender 30 can be readily nested one within the other, as noted in FIG. 8 to facilitate shipping and handling of the box extenders 30. With the nesting of the box extenders, more extenders can be shipped in a smaller box or carton which will greatly reduce shipping costs. By nesting the box extenders 30 during shipping, any damage or waste is greatly minimized. In all other respects, the construction, assembly and use of the modified tapered box extender 30 of FIGS. 7 and 8 is similar to the box extender 15 described with respects to FIGS. 1 to 6.

While the illustrated embodiments of FIGS. 1 to 6 and FIGS. 7 and 8 have tubular bodies that are generally rectangular in shape, other shaped bodies are also feasible, e.g. round bodies, hexagonal bodies, and the like. Also, the box extenders described may be made to any size or shape so as to accommodate any of the standard sized electrical boxes.

Figure 9:
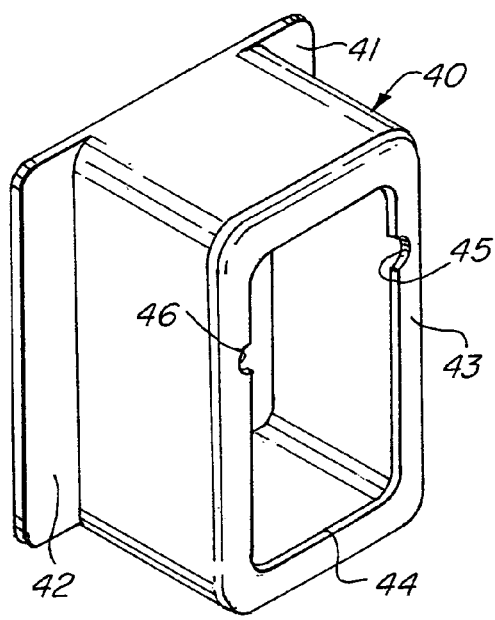
FIG. 9 is a perspective view of another modified embodiment.
Figure 10:
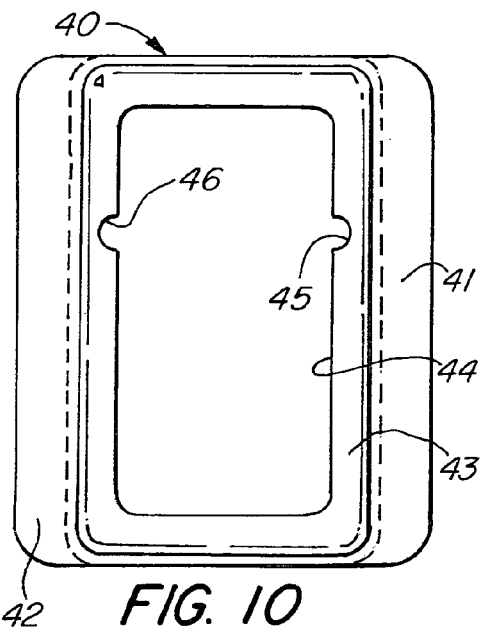
FIG. 10 is a rear view of an embodiment according to FIG. 9.
Figure 12:
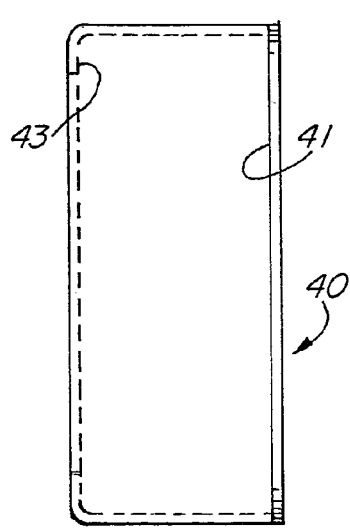
FIG. 12 is a side view of an embodiment according to FIG. 9.

FIGS. 9 to 12 illustrate a further embodiment of the invention. As shown in FIGS. 9 to 12, the box extender 40 is similar to that described with respect to the embodiment of FIG. 3 except that the inner end opposite the face flanges 41, 42 is provided with an inwardly extending circumscribing inner or rear flange 43 to define the rear or inner opening 44. Oppositely disposed in the circumscribing rear flange 43 are clearance notches 45, 46 for accommodating the bear ends of the wire conductors (not shown) which electrically connect to the electrical device, e.g. a GFCI receptacle outlet or switch and the like. The arrangement is such that when the GFCI electrical device is fitted into the box extender 40, the back of the GFCI receptacle is seated against or abuts the rear flange 43. Most GFCI receptacles have two wire termination methods, i.e. side mounted screws that are tightened onto the bare end of the conducting wires or push-in captive lugs located on the back side of the electrical device for insertion of the bare ends of the wire conductors. The advantage of the embodiment of FIG. 9 is that in the event the wire/screw connection is improperly made, any arcing that might occur will be contained by the extender rear flange 43. The notches 45, 46 are positioned adjacent the push-in captive lugs on the back side of the GFCI receptacle in the operative position to provide for the necessary clearance whereby the bare ends of the wire conductors can be readily inserted into the respective push-in captive lug to make the necessary electrical connection to the electrical device.

Figure 13:
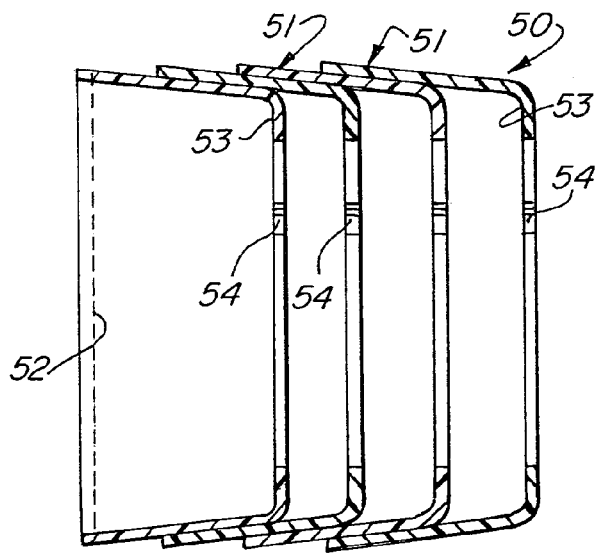
FIG. 13 is a sectional view showing a further modified embodiment in a nesting position.

FIG. 13 illustrates a modified embodiment of the box extender as described with respect to FIGS. 9 to 12. As shown, the box extender 50 of FIG. 13 is provided with a tubular body 51 in which the opposed sides and interconnected top and bottom sides are inwardly tapered, similarly as described with respect to the FIG. 8 embodiment. Each box extender 50 is provided with opposed laterally outwardly extending face flanges 52, and an inner rear flange 53 as herein described with respect to FIGS. 9 to 12. The rear flange 53 is also provided with opposed notices 54 as previously described. In all other respects, the nested embodiment 50 is similar to that of FIG. 9, both structurally and functionally.

It is to be noted that the opposed sides, top and bottom sides in each of the described embodiments are interconnected to define a unitary tubular body that are not designed to be severed or cut at the corners, as required in some of the prior art extenders herein noted. Thus, the described embodiments do not require any trimming or other modification prior to installing the same, as herein described.

While the present invention has been described with respect to various embodiments, it will be understood that variations and modifications thereof may be made without departing from the spirit and scope of this invention.

What is claimed is:

1. An electric box extender for extending a pre-existing mounted electric box, having fastener mounts for securing thereto an electrical device, said electric box extender comprising:
   a tubular body having a front and rear opening,
   said tubular body including a first pair of opposed sides and a second pair of opposed sides interconnected between said first pair of opposed sides,
   a laterally outwardly extending flange connected to one of said pair of opposed sides at said front opening, said other pair of opposed sides being devoid of any outwardly extending flanges at said front opening
   whereby said tubular body is maintained in position between the electric device and the electric box independently of any fastening alignment between the electrical device and the electric box.

2. An electric box extender as defined in claim 1 and including an inwardly extending rear flange circumscribing said rear opening.

3. An electric box extender as defined in claim 2 and including opposed notches formed in said rear flange adapted to accommodate the insertion of wire conductors.

* * * * *